May 19, 1936.                J. DOLZA                2,040,924
BEARING LUBRICATION
Filed Aug. 5, 1935
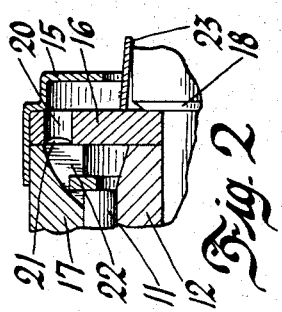
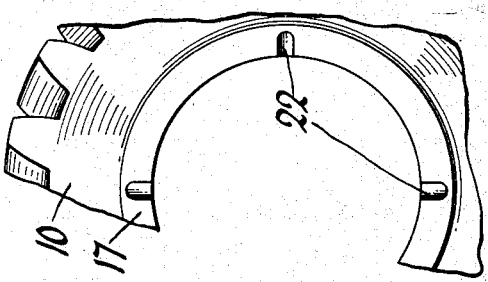
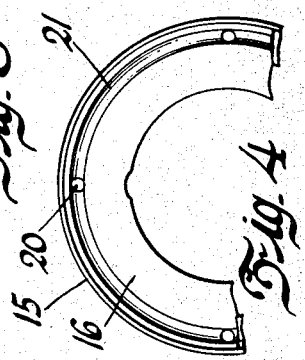
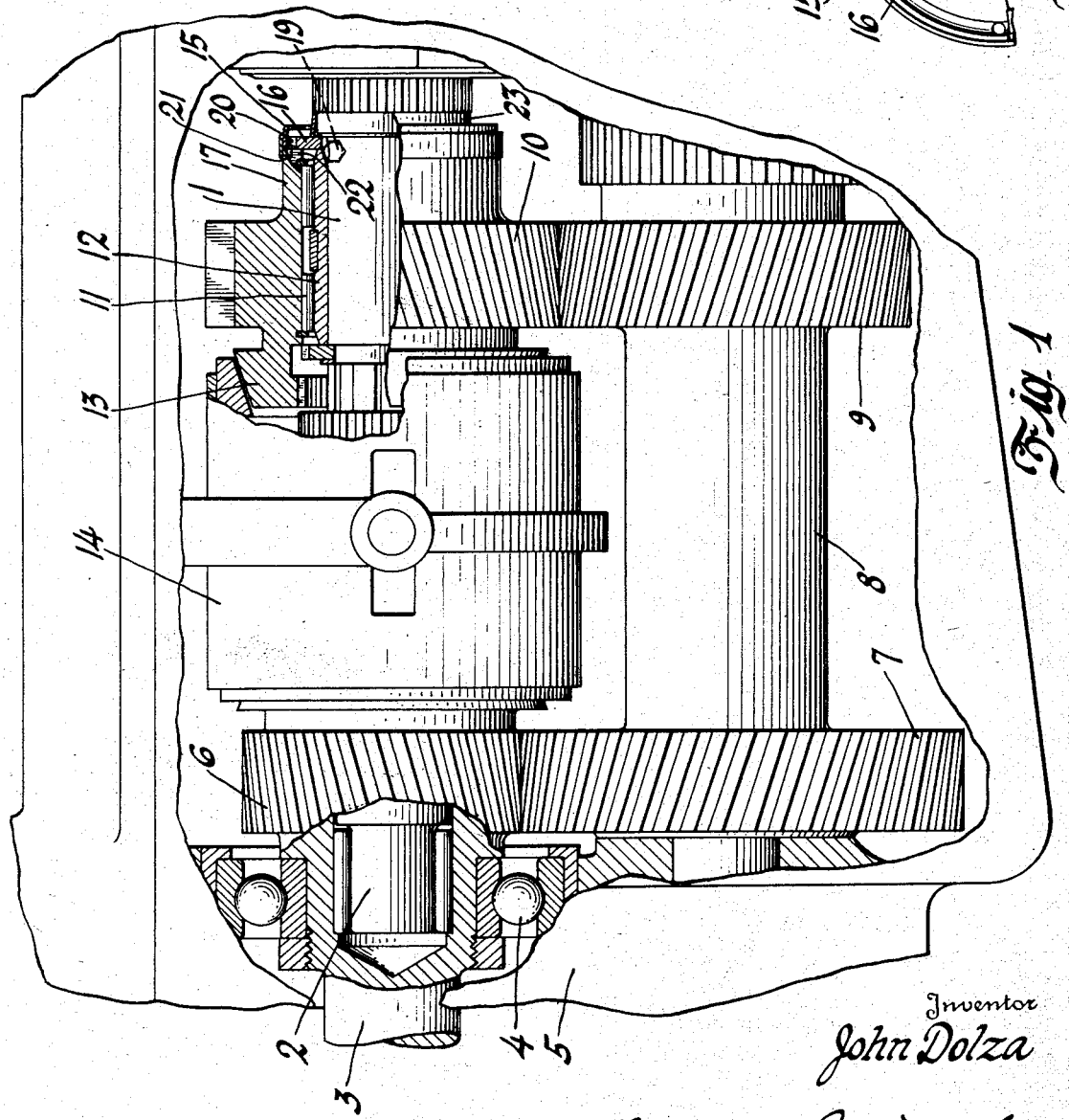
Inventor
John Dolza
By Blackmore, Spencer & Flint
Attorneys Patented May 19, 1936

2,040,924

UNITED STATES PATENT OFFICE 2,040,924

BEARING LUBRICATION

John Dolza, Flint, Mich., assignor to General Motors Corporation, Detroit, Mich., a corporation of Delaware Application August 5, 1935, Serial No. 34,748

5 Claims. (Cl. 308—78)

This invention relates to change speed gearing for motor vehicles and more particularly to the lubrication of the bearing surfaces between the driven shaft and the second speed gear of a constant mesh train.

In a well known type of constant mesh gear transmission, the second speed gear is supported upon the output shaft and is adapted in the intermediate speed setting of the parts to be clutched with the shaft and in any other speed setting to rotate relative to the shaft on suitable bearings. To insure proper lubrication of the bearing surfaces during relative rotation is the primary object of this invention. For the accomplishment of that object it is proposed to take advantage of the relative rotational speeds for supplying the bearing surfaces with lubricant under pressure and this can be done without involved structural changes in existing design.

To be more specific, it is necessary only to associate with the gear and shaft a lubricant conducting passage for directing lubricant thrown by centrifugal action from the shaft to the bearing. As a simple and inexpensive expedient a stamped cup may be provided to afford a collecting pocket and from which lubricant may feed to the bearing through openings formed in the gear and its cooperating thrust washer. In the normal running of a motor car the transmission operates most of the time in the high or direct speed setting and, consequently, the output shaft rotates faster than the second speed gear. Oil within the gear box falling on the shaft will be thrown by centrifugal force and that trapped within the stamping will push ahead to the bearing under pressure exceeding that on the oil within the slower moving gear whereby pressure lubrication results.

For a more complete description reference will be made to the accompanying drawing, wherein Figure 1 shows in elevation a fragment of a transmission with parts broken away and other parts in section; Figure 2 is an enlarged detail view of the collecting trap and associated parts; Figure 3 is an end elevation of a portion of the second speed gear showing the formation of oil grooves in the end face thereof and Figure 4 shows the bearing face of a thrust washer which cooperates with the end of the second speed gear.

Referring to the drawing, the numeral 1 indicates the driven or output shaft of the change speed mechanism, the front end 2 of which is piloted within the end of the driving or input shaft 3. The input shaft is mounted in suitable bearings 4 in the gear box 5 and carries at its end a gear 6 in mesh with a companion gear 7 on a countershaft 8. Additional gears fixed on the countershaft 8 may be provided for constant mesh with cooperating gears for driving the output shaft 1. One such gear is shown at 9 engaging with the second speed gear 10. For rotatably mounting the gear 10 on the output shaft a roller bearing assembly 11 is contained within the gear in engagement with a sleeve 12 keyed or otherwise fixed to the shaft.

At one end the gear carries an extension 13 which is formed with internal clutch teeth and a peripheral conical clutching surface. The slider 14, of conventional design, enables selected speed settings to be effected and involves a conical clutching element for engagement with the cone clutch on the extension 13 and a tooth clutching member for engagement with the internal jaw teeth of the extension. By this construction the initial movement of the slider toward the right in Figure 1 first engages the conical clutching elements to synchronize the gear and driven shaft and the further movement engages the jaw teeth for coupling the gear and shaft for unisonal rotation. At the opposite end of the slider a similar construction is involved for coupling the driving and driven shafts for direct drive engagement when the slider is moved toward the left in the figure.

In the direct drive position of the parts the output shaft rotates faster than the second speed gear which is driven through the countershaft 8. Consequently, centrifugal force on oil thrown from the faster moving driven shaft will be greater than that on the oil enclosed within the slower moving second speed gear. To collect oil thrown from the shaft there is provided a stamped cup 15, welded or otherwise secured to the washer 16, which provides a thrust bearing for the end of the cylindrical projection 17 on the gear 10. This thrust washer may surround the shaft and bear against a shouldered portion 18 of the same and is preferably fixed as by means of a key 19 for rotation with the shaft. At circumferentially spaced points the washer is provided with a number of openings 20 drilled axially therethrough and which communicate with an annular groove 21 formed in the bearing face of the washer. This annular groove 21 is intended to provide open communication at all times with a series of slots or openings 22 which may be cut as spaced points in the end of the extension 17 leading to the interior of the bearing receiving space. Thus the oil passages provided by the openings 20, 21 and 22 eliminate need for extra parts and lead the oil directly to the bearing space from the collecting pocket 15.

To assist in directing oil into the pocket, the shaft is shown as being provided with a sleeve 23 which flares outwardly immediately adjacent the pocket. This outwardly flaring peripheral surface may be formed directly on the shaft, but for convenience of assembly the use of a separate sleeve is to be preferred.

From the above description it will be apparent that there has been provided in a commercially feasible manner an arrangement of parts whereby advantage is taken of normal operating conditions to insure an abundance of lubricant under pressure for the supporting bearing between the driven shaft and the second speed gear of a constant mesh train.

I claim:

1. In change speed gearing of the constant mesh type, a shaft, a gear having a bearing on the shaft for relative rotation, an oil passage carried by the gear to lead oil inwardly to said bearing and a collecting trough to direct oil thrown from the shaft through the passage.

2. Change speed gearing including a driving member, a driven shaft, a gear supported on the shaft for constant driving engagement with said member, means to clutch the gear and shaft together, other means to drive the shaft from said member independently of the driving of said gear, and means to collect lubricant thrown from the shaft and lead the same to the relatively moving bearing surfaces of the shaft and gear when the shaft is driven by the last mentioned means.

3. Change speed mechanism, including driving and driven shafts, a train of gears in constant driven engagement with said driving shaft with one of the gears thereof supported rotatably on the driven shaft, means for transmitting the drive between the shafts either directly or through said gearing, and means to deflect lubricant thrown from the driven shaft through centrifugal action to the supporting bearing for the gear mounted on said shaft.

4. In change speed mechanism of the character described, a driven shaft, a second speed gear mounted upon said shaft, a thrust ring between the end of the gear and a shoulder on the shaft and a deflector carried by the ring to collect lubricant thrown from the shaft and lead the same through an opening in the ring to the bearing surfaces of the shaft and gear.

5. In change speed mechanism of the character described, an output shaft, a second speed gear bearing on said shaft and having in an end face thereof a series of circumferentially spaced slots leading to the bearing surfaces, a thrust washer carried by the shaft with one face engaging said end face of the gear and having therein an annular groove communicating with said slots, a collecting pocket carried by the washer on the other face thereof and communicating with said groove through an opening in the washer, and an outwardly flared peripheral surface on the shaft adjacent said pocket to lead thereinto lubricant thrown from the shaft upon rotation thereof.

JOHN DOLZA.